United States Patent
McCormack et al.

(10) Patent No.: US 9,531,408 B2
(45) Date of Patent: Dec. 27, 2016

(54) EXTREMELY HIGH FREQUENCY COMMUNICATION CHIP

(71) Applicant: Keyssa, Inc., Mountain View, CA (US)

(72) Inventors: Gary D. McCormack, Tigard, OR (US); Ian A. Kyles, West Linn, OR (US)

(73) Assignee: Keyssa, Inc., Campbell, CA (US)

( * ) Notice: Subject to any disclaimer, the term of this patent is extended or adjusted under 35 U.S.C. 154(b) by 0 days.

(21) Appl. No.: 14/215,069

(22) Filed: Mar. 17, 2014

(65) Prior Publication Data

US 2014/0273894 A1 Sep. 18, 2014

Related U.S. Application Data

(60) Provisional application No. 61/799,593, filed on Mar. 15, 2013, provisional application No. 61/799,527, filed on Mar. 15, 2013.

(51) Int. Cl.
*H04B 1/04* (2006.01)
*H04B 1/44* (2006.01)
*H04B 5/00* (2006.01)

(52) U.S. Cl.
CPC ........... *H04B 1/04* (2013.01); *H04B 1/44* (2013.01); *H04B 5/0031* (2013.01)

(58) Field of Classification Search
CPC .............. H04B 1/38; H04B 1/40; H04B 1/403; H04B 1/44; H04B 1/48
USPC .................. 455/73, 78, 79, 84, 102, 103
See application file for complete search history.

(56) References Cited

U.S. PATENT DOCUMENTS

| | | | |
|---|---|---|---|
| 2,753,551 | A | 7/1956 | Richmond |
| 3,796,831 | A | 3/1974 | Bauer |
| 3,971,930 | A | 7/1976 | Fitzmaurice et al. |
| 3,987,365 | A | 10/1976 | Okada et al. |
| 4,293,833 | A | 10/1981 | Popa |

(Continued)

FOREIGN PATENT DOCUMENTS

| | | |
|---|---|---|
| CN | 2237914 Y | 10/1996 |
| CN | 1178402 A | 4/1998 |

(Continued)

OTHER PUBLICATIONS

Japanese Office Action, Japanese Application No. 2015-004839, Aug. 10, 2015, 12 pages.

(Continued)

*Primary Examiner* — Nguyen Vo
(74) *Attorney, Agent, or Firm* — Fenwick & West LLP

(57) ABSTRACT

An electromagnetic Extremely High Frequency (EHF) communication chip includes one or more local oscillator circuits, a transducer circuit and at least one of a modulator or a demodulator coupled to the transducer circuit. Each of the local oscillator circuits may have a local oscillator and configured collectively to generate first and second carrier signals having respective first and second EHF frequencies. The first EHF frequency may be different than the second EHF frequency. The transducer circuit may have a first transducer for transmitting and receiving EHF communication signals. The modulator may be coupled to the local oscillator circuits for modulating the first carrier signal or the second carrier signal with a first transmit base data signal. The demodulator may be for demodulating the first carrier signal or the second carrier signal to produce a first receive base data signal.

19 Claims, 2 Drawing Sheets

(56) References Cited

U.S. PATENT DOCUMENTS

| | | | |
|---|---|---|---|
| 4,485,312 A | 11/1984 | Kusakabe et al. | |
| 4,497,068 A | 1/1985 | Fischer | |
| 4,525,693 A | 6/1985 | Suzuki et al. | |
| 4,694,504 A | 9/1987 | Porter et al. | |
| 4,771,294 A | 9/1988 | Wasilousky | |
| 4,800,350 A | 1/1989 | Bridges et al. | |
| 4,875,026 A | 10/1989 | Walter et al. | |
| 4,946,237 A | 8/1990 | Arroyo et al. | |
| 5,164,942 A | 11/1992 | Kamerman et al. | |
| 5,199,086 A | 3/1993 | Johnson et al. | |
| 5,471,668 A | 11/1995 | Soenen et al. | |
| 5,543,808 A | 8/1996 | Feigenbaum et al. | |
| 5,621,913 A | 4/1997 | Tuttle et al. | |
| 5,749,052 A | 5/1998 | Hidem et al. | |
| 5,754,948 A | 5/1998 | Metze | |
| 5,773,878 A | 6/1998 | Lim et al. | |
| 5,786,626 A | 7/1998 | Brady et al. | |
| 5,861,782 A | 1/1999 | Saitoh | |
| 5,921,783 A | 7/1999 | Fritsch et al. | |
| 5,941,729 A | 8/1999 | Sri-Jayantha | |
| 5,943,374 A | 8/1999 | Kokuryo et al. | |
| 5,956,626 A | 9/1999 | Kaschke et al. | |
| 6,011,785 A * | 1/2000 | Carney | H04B 1/0003 370/330 |
| 6,072,433 A | 6/2000 | Young et al. | |
| 6,252,767 B1 | 6/2001 | Carlson | |
| 6,351,237 B1 | 2/2002 | Martek et al. | |
| 6,373,447 B1 | 4/2002 | Rostoker et al. | |
| 6,490,443 B1 | 12/2002 | Freeny, Jr. | |
| 6,492,973 B1 | 12/2002 | Kuroki et al. | |
| 6,534,784 B2 | 3/2003 | Eliasson et al. | |
| 6,542,720 B1 | 4/2003 | Tandy | |
| 6,590,544 B1 | 7/2003 | Filipovic | |
| 6,607,136 B1 | 8/2003 | Alsmon et al. | |
| 6,647,246 B1 | 11/2003 | Lu | |
| 6,718,163 B2 | 4/2004 | Tandy | |
| 6,768,770 B1 * | 7/2004 | Lipperer | H04B 1/44 340/7.42 |
| 6,803,841 B2 | 10/2004 | Saitoh et al. | |
| 6,915,529 B1 | 7/2005 | Suematsu et al. | |
| 6,967,347 B2 | 11/2005 | Estes et al. | |
| 7,050,763 B2 | 5/2006 | Stengel et al. | |
| 7,107,019 B2 | 9/2006 | Tandy | |
| 7,113,087 B1 | 9/2006 | Casebolt et al. | |
| 7,213,766 B2 | 5/2007 | Ryan et al. | |
| 7,311,526 B2 | 12/2007 | Rohrbach et al. | |
| 7,512,395 B2 | 3/2009 | Beukema et al. | |
| 7,517,222 B2 | 4/2009 | Rohrbach et al. | |
| 7,593,708 B2 | 9/2009 | Tandy | |
| 7,598,923 B2 | 10/2009 | Hardacker et al. | |
| 7,599,427 B2 | 10/2009 | Bik | |
| 7,612,630 B2 | 11/2009 | Miller | |
| 7,617,342 B2 | 11/2009 | Rofougaran | |
| 7,645,143 B2 | 1/2010 | Rohrbach et al. | |
| 7,656,205 B2 | 2/2010 | Chen et al. | |
| 7,664,461 B2 | 2/2010 | Rofougaran et al. | |
| 7,760,045 B2 | 7/2010 | Kawasaki | |
| 7,761,092 B2 | 7/2010 | Desch et al. | |
| 7,768,457 B2 | 8/2010 | Pettus et al. | |
| 7,769,347 B2 | 8/2010 | Louberg et al. | |
| 7,778,621 B2 | 8/2010 | Tandy | |
| 7,791,167 B1 | 9/2010 | Rofougaran | |
| 7,820,990 B2 | 10/2010 | Schroeder et al. | |
| 7,881,675 B1 | 2/2011 | Gazdzinski | |
| 7,881,753 B2 | 2/2011 | Rofougaran | |
| 7,889,022 B2 | 2/2011 | Miller | |
| 7,907,924 B2 | 3/2011 | Kawasaki | |
| 7,929,474 B2 | 4/2011 | Pettus et al. | |
| 7,975,079 B2 | 7/2011 | Bennett et al. | |
| 8,013,610 B1 | 9/2011 | Merewether et al. | |
| 8,014,416 B2 | 9/2011 | Ho et al. | |
| 8,023,886 B2 | 9/2011 | Rofougaran | |
| 8,036,629 B2 | 10/2011 | Tandy | |
| 8,041,227 B2 | 10/2011 | Holcombe et al. | |
| 8,063,769 B2 | 11/2011 | Rofougaran | |
| 8,081,699 B2 | 12/2011 | Siwiak et al. | |
| 8,087,939 B2 | 1/2012 | Rohrbach et al. | |
| 8,121,542 B2 | 2/2012 | Zack et al. | |
| 8,131,645 B2 | 3/2012 | Lin et al. | |
| 8,183,935 B2 | 5/2012 | Milano et al. | |
| 8,244,175 B2 | 8/2012 | Rofougaran | |
| 8,244,179 B2 | 8/2012 | Dua | |
| 8,279,611 B2 | 10/2012 | Wong et al. | |
| 8,339,258 B2 | 12/2012 | Rofougaran | |
| 8,346,847 B2 | 1/2013 | Steakley | |
| 8,422,482 B2 | 4/2013 | Sugita | |
| 8,554,136 B2 | 10/2013 | McCormack | |
| 8,634,767 B2 | 1/2014 | Rofougaran et al. | |
| 8,755,849 B2 | 6/2014 | Rofougaran et al. | |
| 8,794,980 B2 | 8/2014 | McCormack | |
| 8,811,526 B2 | 8/2014 | McCormack et al. | |
| 8,812,833 B2 | 8/2014 | Liu et al. | |
| 8,939,773 B2 | 1/2015 | McCormack | |
| 9,374,154 B2 | 6/2016 | Kyles et al. | |
| 2002/0008665 A1 | 1/2002 | Takenoshita | |
| 2002/0027481 A1 | 3/2002 | Fiedziuszko | |
| 2002/0058484 A1 | 5/2002 | Bobier et al. | |
| 2002/0106041 A1 | 8/2002 | Chang et al. | |
| 2002/0118083 A1 | 8/2002 | Pergande | |
| 2002/0140584 A1 | 10/2002 | Maeda et al. | |
| 2003/0025626 A1 | 2/2003 | McEwan | |
| 2003/0088404 A1 | 5/2003 | Koyanagi | |
| 2003/0137371 A1 | 7/2003 | Saitoh et al. | |
| 2004/0043734 A1 | 3/2004 | Hashidate | |
| 2004/0160294 A1 | 8/2004 | Elco | |
| 2004/0214621 A1 | 10/2004 | Ponce De Leon et al. | |
| 2005/0032474 A1 | 2/2005 | Gordon | |
| 2005/0099242 A1 | 5/2005 | Sano | |
| 2005/0109841 A1 | 5/2005 | Ryan et al. | |
| 2005/0124307 A1 * | 6/2005 | Ammar | H04B 1/38 455/183.2 |
| 2005/0140436 A1 | 6/2005 | Ichitsubo et al. | |
| 2005/0259824 A1 | 11/2005 | Isozaki et al. | |
| 2006/0003710 A1 | 1/2006 | Nakagawa et al. | |
| 2006/0029229 A1 | 2/2006 | Trifonov et al. | |
| 2006/0038168 A1 | 2/2006 | Estes et al. | |
| 2006/0051981 A1 | 3/2006 | Neidlein et al. | |
| 2006/0077043 A1 | 4/2006 | Amtmann et al. | |
| 2006/0082518 A1 | 4/2006 | Ram | |
| 2006/0128372 A1 | 6/2006 | Gazzola | |
| 2006/0140305 A1 | 6/2006 | Netsell et al. | |
| 2006/0159158 A1 | 7/2006 | Moore et al. | |
| 2006/0166740 A1 | 7/2006 | Sufuentes | |
| 2006/0258289 A1 | 11/2006 | Dua | |
| 2006/0276157 A1 | 12/2006 | Chen et al. | |
| 2007/0010295 A1 | 1/2007 | Greene | |
| 2007/0024504 A1 | 2/2007 | Matsunaga | |
| 2007/0035917 A1 | 2/2007 | Hotelling et al. | |
| 2007/0063056 A1 | 3/2007 | Gaucher et al. | |
| 2007/0070814 A1 | 3/2007 | Frodyma et al. | |
| 2007/0147425 A1 | 6/2007 | Lamoureux et al. | |
| 2007/0229270 A1 | 10/2007 | Rofougaran | |
| 2007/0242621 A1 | 10/2007 | Nandagopalan et al. | |
| 2007/0273476 A1 | 11/2007 | Yamazaki et al. | |
| 2007/0278632 A1 | 12/2007 | Zhao et al. | |
| 2008/0002652 A1 | 1/2008 | Gupta et al. | |
| 2008/0055093 A1 | 3/2008 | Shkolnikov et al. | |
| 2008/0055303 A1 | 3/2008 | Ikeda | |
| 2008/0089667 A1 | 4/2008 | Grady et al. | |
| 2008/0112101 A1 | 5/2008 | McElwee et al. | |
| 2008/0142250 A1 | 6/2008 | Tang | |
| 2008/0143435 A1 | 6/2008 | Wilson et al. | |
| 2008/0150799 A1 | 6/2008 | Hemmi et al. | |
| 2008/0150821 A1 | 6/2008 | Koch et al. | |
| 2008/0159243 A1 | 7/2008 | Rofougaran | |
| 2008/0165002 A1 | 7/2008 | Tsuji | |
| 2008/0165065 A1 | 7/2008 | Hill et al. | |
| 2008/0192726 A1 | 8/2008 | Mahesh et al. | |
| 2008/0195788 A1 | 8/2008 | Tamir et al. | |
| 2008/0197973 A1 | 8/2008 | Enguent | |
| 2008/0238632 A1 | 10/2008 | Endo et al. | |
| 2008/0289426 A1 | 11/2008 | Kearns et al. | |
| 2008/0290959 A1 | 11/2008 | Ali et al. | |
| 2008/0293446 A1 | 11/2008 | Rofougaran | |

(56) References Cited

U.S. PATENT DOCUMENTS

| | | |
|---|---|---|
| 2009/0006677 A1 | 1/2009 | Rofougaran |
| 2009/0009337 A1 | 1/2009 | Rofougaran |
| 2009/0015353 A1 | 1/2009 | Rofougaran |
| 2009/0028177 A1 | 1/2009 | Pettus et al. |
| 2009/0029659 A1* | 1/2009 | Gonzalez ............. H04B 1/1607 455/127.1 |
| 2009/0033455 A1 | 2/2009 | Strat et al. |
| 2009/0037628 A1 | 2/2009 | Rofougaran |
| 2009/0073070 A1 | 3/2009 | Rofougaran |
| 2009/0075688 A1 | 3/2009 | Rofougaran |
| 2009/0086844 A1 | 4/2009 | Rofougaran |
| 2009/0091486 A1 | 4/2009 | Wiesbauer et al. |
| 2009/0094506 A1 | 4/2009 | Lakkis |
| 2009/0098826 A1 | 4/2009 | Zack et al. |
| 2009/0110131 A1 | 4/2009 | Bornhoft et al. |
| 2009/0111390 A1 | 4/2009 | Sutton et al. |
| 2009/0175323 A1 | 7/2009 | Chung |
| 2009/0180408 A1 | 7/2009 | Graybeal et al. |
| 2009/0189873 A1 | 7/2009 | Peterson et al. |
| 2009/0218407 A1 | 9/2009 | Rofougaran |
| 2009/0218701 A1 | 9/2009 | Rofougaran |
| 2009/0236701 A1 | 9/2009 | Sun et al. |
| 2009/0237317 A1 | 9/2009 | Rofougaran |
| 2009/0239392 A1 | 9/2009 | Sumitomo et al. |
| 2009/0239483 A1 | 9/2009 | Rofougaran |
| 2009/0245808 A1 | 10/2009 | Rofougaran |
| 2009/0257445 A1 | 10/2009 | Chan et al. |
| 2009/0280765 A1 | 11/2009 | Rofougaran et al. |
| 2009/0310649 A1 | 12/2009 | Fisher et al. |
| 2010/0009627 A1 | 1/2010 | Huomo |
| 2010/0063866 A1 | 3/2010 | Kinoshita et al. |
| 2010/0071031 A1 | 3/2010 | Carter et al. |
| 2010/0103045 A1 | 4/2010 | Liu et al. |
| 2010/0120406 A1 | 5/2010 | Banga et al. |
| 2010/0127804 A1 | 5/2010 | Vouloumanos |
| 2010/0149149 A1 | 6/2010 | Lawther |
| 2010/0159829 A1 | 6/2010 | McCormack |
| 2010/0167645 A1 | 7/2010 | Kawashimo |
| 2010/0202345 A1 | 8/2010 | Jing et al. |
| 2010/0202499 A1 | 8/2010 | Lee et al. |
| 2010/0203833 A1 | 8/2010 | Dorsey |
| 2010/0231452 A1 | 9/2010 | Babakhani et al. |
| 2010/0260274 A1 | 10/2010 | Yamada et al. |
| 2010/0265648 A1 | 10/2010 | Hirabayashi |
| 2010/0277394 A1 | 11/2010 | Haustein et al. |
| 2010/0282849 A1 | 11/2010 | Mair |
| 2010/0283700 A1 | 11/2010 | Rajanish et al. |
| 2010/0285634 A1 | 11/2010 | Rofougaran |
| 2010/0289591 A1 | 11/2010 | Garcia |
| 2010/0297954 A1 | 11/2010 | Rofougaran et al. |
| 2010/0315954 A1 | 12/2010 | Singh et al. |
| 2011/0009078 A1 | 1/2011 | Kawamura |
| 2011/0012727 A1 | 1/2011 | Pance et al. |
| 2011/0038282 A1 | 2/2011 | Mihota et al. |
| 2011/0044404 A1 | 2/2011 | Vromans |
| 2011/0047588 A1 | 2/2011 | Takeuchi et al. |
| 2011/0050446 A1 | 3/2011 | Anderson et al. |
| 2011/0084398 A1 | 4/2011 | Pilard et al. |
| 2011/0092212 A1 | 4/2011 | Kubota |
| 2011/0122932 A1* | 5/2011 | Lovberg ............. H04L 27/2039 375/219 |
| 2011/0127954 A1 | 6/2011 | Walley et al. |
| 2011/0181484 A1 | 7/2011 | Pettus et al. |
| 2011/0197237 A1 | 8/2011 | Turner |
| 2011/0207425 A1 | 8/2011 | Juntunen et al. |
| 2011/0221582 A1 | 9/2011 | Chuey et al. |
| 2011/0249659 A1 | 10/2011 | Fontaine et al. |
| 2011/0250928 A1 | 10/2011 | Schlub et al. |
| 2011/0285606 A1 | 11/2011 | De Graauw et al. |
| 2011/0286703 A1 | 11/2011 | Kishima et al. |
| 2011/0292972 A1 | 12/2011 | Budianu et al. |
| 2011/0311231 A1 | 12/2011 | Ridgway et al. |
| 2012/0009880 A1 | 1/2012 | Trainin et al. |
| 2012/0013499 A1 | 1/2012 | Hayata |
| 2012/0028582 A1 | 2/2012 | Tandy |
| 2012/0064664 A1 | 3/2012 | Yamazaki et al. |
| 2012/0069772 A1 | 3/2012 | Byrne et al. |
| 2012/0072620 A1 | 3/2012 | Jeong et al. |
| 2012/0082194 A1 | 4/2012 | Tam et al. |
| 2012/0083137 A1 | 4/2012 | Rohrbach et al. |
| 2012/0091799 A1 | 4/2012 | Rofougaran et al. |
| 2012/0110635 A1 | 5/2012 | Harvey et al. |
| 2012/0126794 A1 | 5/2012 | Jensen et al. |
| 2012/0139768 A1 | 6/2012 | Loeda et al. |
| 2012/0219039 A1 | 8/2012 | Feher |
| 2012/0249366 A1 | 10/2012 | Pozgay et al. |
| 2012/0263244 A1 | 10/2012 | Kyles et al. |
| 2012/0265596 A1 | 10/2012 | Mazed et al. |
| 2012/0286049 A1 | 11/2012 | McCormack et al. |
| 2012/0290760 A1 | 11/2012 | McCormack et al. |
| 2012/0295539 A1 | 11/2012 | McCormack et al. |
| 2012/0307932 A1 | 12/2012 | McCormack et al. |
| 2012/0319496 A1 | 12/2012 | McCormack et al. |
| 2012/0319890 A1 | 12/2012 | McCormack et al. |
| 2013/0070817 A1 | 3/2013 | McCormack et al. |
| 2013/0106673 A1 | 5/2013 | McCormack et al. |
| 2013/0109303 A1 | 5/2013 | McCormack et al. |
| 2013/0157477 A1 | 6/2013 | McCormack |
| 2013/0183903 A1 | 7/2013 | McCormack et al. |
| 2013/0196598 A1 | 8/2013 | McCormack et al. |
| 2013/0257670 A1 | 10/2013 | Sovero et al. |
| 2013/0278360 A1 | 10/2013 | Kim et al. |
| 2013/0316653 A1 | 11/2013 | Kyles et al. |
| 2014/0038521 A1 | 2/2014 | McCormack |
| 2014/0043208 A1 | 2/2014 | McCormack et al. |
| 2014/0148193 A1 | 5/2014 | Kogan et al. |
| 2014/0266331 A1* | 9/2014 | Arora ..................... H03B 19/14 327/119 |
| 2014/0269414 A1 | 9/2014 | Hyde et al. |
| 2015/0111496 A1 | 4/2015 | McCormack et al. |

FOREIGN PATENT DOCUMENTS

| | | |
|---|---|---|
| CN | 2313296 Y | 4/1999 |
| CN | 1389988 A | 1/2003 |
| CN | 1781255 A | 5/2006 |
| CN | 1812254 A | 8/2006 |
| CN | 101090179 A | 12/2007 |
| CN | 101496298 A | 7/2009 |
| CN | 201562854 U | 8/2010 |
| CN | 102156510 A | 8/2011 |
| CN | 104937956 A | 9/2015 |
| EP | 0152246 A2 | 8/1985 |
| EP | 0515187 A2 | 11/1992 |
| EP | 0789421 A2 | 8/1997 |
| EP | 0884799 A2 | 12/1998 |
| EP | 0896380 A2 | 2/1999 |
| EP | 0996189 A2 | 4/2000 |
| EP | 1041666 A1 | 10/2000 |
| EP | 1298809 A2 | 4/2003 |
| EP | 1357395 A1 | 10/2003 |
| EP | 1798867 A2 | 6/2007 |
| EP | 2106192 A2 | 9/2009 |
| EP | 2309608 A1 | 4/2011 |
| EP | 2328226 A1 | 6/2011 |
| EP | 2360923 A1 | 8/2011 |
| GB | 817349 | 7/1959 |
| GB | 2217114 | 10/1989 |
| JP | 52-72502 A | 6/1977 |
| JP | 5-236031 A | 9/1993 |
| JP | 5-327788 A | 12/1993 |
| JP | 07-006817 A | 1/1995 |
| JP | 9-83538 A | 3/1997 |
| JP | 10-13296 A | 1/1998 |
| JP | H10-065568 A | 3/1998 |
| JP | H11-298343 A | 10/1999 |
| JP | 2000-022665 A | 1/2000 |
| JP | 2001-153963 A | 6/2001 |
| JP | 2001-326506 A | 11/2001 |
| JP | 2002-261514 A | 9/2002 |
| JP | 2002-265729 A | 9/2002 |
| JP | 2003-209511 A | 7/2003 |
| JP | 2004-505505 A | 2/2004 |
| JP | 2005-117153 A | 4/2005 |

(56) References Cited

FOREIGN PATENT DOCUMENTS

| | | | |
|---|---|---|---|
| JP | 2008-022247 A | 1/2008 |
| JP | 2008-079241 | 4/2008 |
| JP | 2008-124917 A | 5/2008 |
| JP | 2008-129919 A | 6/2008 |
| JP | 2008-250713 A | 10/2008 |
| JP | 2008 252566 A | 10/2008 |
| JP | 2008252566 A | 10/2008 |
| JP | 2009-231114 | 7/2009 |
| JP | 2009-239842 A | 10/2009 |
| JP | 2010-509834 A | 3/2010 |
| JP | 2010-183055 A | 8/2010 |
| JP | 2010-531035 A | 9/2010 |
| JP | 2011-022640 A | 2/2011 |
| JP | 2011-41078 A | 2/2011 |
| JP | 2011-044944 A | 3/2011 |
| JP | 2011-176672 A | 9/2011 |
| JP | 2014-516221 | 7/2014 |
| TW | 200520434 A | 6/2005 |
| TW | 200810444 A | 2/2008 |
| TW | 201249293 A1 | 12/2012 |
| WO | 97/32413 A1 | 9/1997 |
| WO | WO 97/32413 A | 9/1997 |
| WO | WO 2006/133108 A2 | 12/2006 |
| WO | WO 2009/113373 A1 | 9/2009 |
| WO | 2011/114737 A1 | 9/2011 |
| WO | 2011/114738 A1 | 9/2011 |
| WO | WO 2011/114737 A1 | 9/2011 |
| WO | WO 2011/114738 A1 | 9/2011 |
| WO | 2012/129426 A3 | 9/2012 |
| WO | WO 2012/129426 A3 | 9/2012 |
| WO | WO 2012/154550 A1 | 11/2012 |
| WO | WO 2012/155135 A3 | 11/2012 |
| WO | 2012/166922 A1 | 12/2012 |
| WO | WO 2012/166922 A1 | 12/2012 |
| WO | WO 2012/174350 A1 | 12/2012 |
| WO | WO 2013/006641 A3 | 1/2013 |
| WO | 2013/040396 A1 | 3/2013 |
| WO | WO 2013/040396 A1 | 3/2013 |
| WO | WO 2013/059801 A1 | 4/2013 |
| WO | WO 2013/059802 A1 | 4/2013 |
| WO | WO 2013/090625 A1 | 6/2013 |
| WO | 2013/134444 A1 | 9/2013 |
| WO | WO 2013/131095 A1 | 9/2013 |
| WO | WO 2013/134444 A1 | 9/2013 |
| WO | WO 2014/026191 A1 | 2/2014 |

OTHER PUBLICATIONS

United States Office Action, U.S. Appl. No. 13/963,199, Jul. 27, 2015, 9 pages.
United States Office Action, U.S. Appl. No. 14/109,938, Aug. 14, 2015, 12 pages.
Bluetooth Audio Dongle Receiver 3.5mm Stereo, Feb. 8, 2013.
Bluetooth Headset, Jabra clipper, Jul. 28, 2010.
Chinese Office Action, Chinese Application No. 201280025060.8, Oct. 30, 2014, 8 pages (with concise explanation of relevance).
ECMA Standard: "Standard ECMA-398: Close Proximity Electric Induction Wireless Communications," Jun. 1, 2011, pp. 1-100, May be retrieved from the Internet<URL:http://www.ecma-international.org/publications/standards/Ecma-398.htm>.
Future Technology Devices Interntional Limited (FTDI) "Technical Note TN_I 13 Simplified Description ofUSB Device Enumeration", Doc. Ref. No. FT_000180, Version 1.0, Issue Date Oct. 28, 2009, 19 pages.
Goldstone , L. L., "MM Wave Transmission Polarizer", International Symposium Digest—Antennas & Propagation vol. 2, Jun. 1979, 5 pages.
Japanese Office Action, Japanese Patent Office, "Notice of Reasons for Rejection" in connection with related Japanese Patent Application No. 2014-501249, dated Jul. 22, 2014, 7 pages.
Japanese Office Action, Japanese Application No. 2014-513697, Jan. 20, 2015, 7 pages.

Juntunen, E. A., "60 GHz CMOS Pico-Joule/Bit Oook Receiver Design for Multi-Gigabit Per Second Wireless Communications" thesis paper, Aug. 2008, 52 pages.
Korean Office Action, Korean Application No. 10-2013-7027865, Oct. 22, 2014, 12 pages.
Office of Engineering and Technology Federal Communications Commission, "Understanding the FCC Regulations for Low-Power, Non-Licensed Transmitters", OET Bulletin No. 63, Oct. 1993, 34 pages.
PCT International Search Report, PCT Patent Application No. PCT/US2013/027835, dated May 3, 2013, 4 pages.
PCT Written Opinion, PCT Patent Application No. PCT/US2013/027835, May 3, 2013, 8 pages.
PCT International Search Report, PCT Patent Application No. PCT/US2013/029469, Jun. 6, 2013, 5 pages.
PCT Written Opinion, PCT Patent Application No. PCT/US2013/029469, Jun. 6, 2013, 5 pages.
PCT International Search Report, PCT Patent Application No. PCT/US2013/023665, Jun. 20, 2013, 5 pages.
PCT Written Opinion, PCT Patent Application No. PCT/US2013/023665, Jun. 20, 2013, 10 pages.
PCT International Search Report, PCT Patent Application No. PCT/US2012/040214, Aug. 21, 2012, 3 pages.
PCT Written Opinion, PCT Patent Application No. PCT/US2012/040214, Aug. 21, 2012, 8 pages.
PCT International Search Report, PCT Patent Application No. PCT/US2012/042616, Oct. 1, 2012, 4 pages.
PCT Written Opinion, PCT Patent Application No. PCT/US2012/042616, Oct. 1, 2012, 10 pages.
PCT International Search Report, PCT Patent Application No. PCT/US2012/030166, Oct. 31, 2010, 6 pages.
PCT Written Opinion, PCT Patent Application No. PCT/US2012/030166, Oct. 31, 2010, 9 pages.
PCT International Search Report, PCT Patent Application No. PCT/US2012/055488, Dec. 13, 2012, 4 pages.
PCT Written Opinion, PCT Patent Application No. PCT/US2012/055488, Dec. 13, 2012, 8 pages.
PCT International Search Report, PCT Patent Application No. PCT/US2012/045444, Jan. 21, 2013, 7 pages.
PCT Written Opinion, PCT Patent Application No. PCT/US2012/045444, Jan. 21, 2013, 9 pages.
PCT International Search Report, PCT Patent Application No. PCT/US2012/037795, Jan. 21, 2013, 7 pages.
PCT Written Opinion, PCT Patent Application No. PCT/US2012/037795, Jan. 21, 2013, 12 pages.
PCT International Search Report, PCT Patent Application No. PCT/US2012/061345, Jan. 24, 2013, 4 pages.
PCT Written Opinion, PCT Patent Application No. PCT/US2012/061345, Jan. 24, 2013, 7 pages.
PCT International Search Report, PCT Patent Application No. PCT/US2012/061346, Jan. 24, 2013, 5 pages.
PCT Written Opinion, PCT Patent Application No. PCT/US2012/061346, Jan. 24, 2013, 9 pages.
PCT International Search Report, PCT Patent Application No. PCT/US2012/069576, May 2, 2013, 3 pages.
PCT Written Opinion, PCT Patent Application No. PCT/US2012/069576, May 2, 2013, 13 pages.
PCT International Search Report, PCT Patent Application No. PCT/US2013/028896, Sep. 26, 2013, 4 pages.
PCT Written Opinion, PCT Patent Application No. PCT/US2013/028896, Sep. 26, 2013, 4 pages.
PCT International Search Report, PCT Patent Application No. PCT/US2013/046631, Sep. 20, 2013, 4 pages.
PCT Written Opinion, PCT Patent Application No. PCT/US2013/046631, Sep. 20, 2013, 6 pages.
PCT International Search Report, PCT Patent Application No. PCT/US2013/054292, Nov. 29, 2013, 4 pages.
PCT Written Opinion, PCT Patent Application No. PCT/US2013/054292, Nov. 29, 2013, 7 pages.
PCT International Search Report and Written Opinion, PCT Application No. PCT/US2014/024027, Jul. 21, 2014, 15 pages.
PCT International Search Report, PCT Application No. PCT/US2013/075222, Jul. 17, 2014, 4 pages.

(56) References Cited

OTHER PUBLICATIONS

PCT Written Opinion, PCT Application No. PCT/US2013/075222, Jul. 17, 2014, 8 pages.
PCT International Search Report, PCT Application No. PCT/US2013/075892, Apr. 23, 2014, 4 pages.
PCT Written Opinion, PCT Application No. PCT/US2013/075892, Apr. 23, 2014, 8 pages.
PCT International Search Report and Written Opinion, PCT Application No. PCT/US2013/033394, Aug. 8, 2013, 10 pages.
PCT International Search Report and Written Opinion, PCT Application No. PCT/US2013/055487, Jan. 24, 2014, 9 pages.
PCT International Search Report and Written Opinion, PCT Application No. PCT/US2013/076687, May 21, 2014, 20 pages.
PCT International Search Report and Written Opinion, PCT Application No. PCT/US2014/030115, Sep. 22, 2014, 15 pages.
PCT International Search Report and Written Opinion, PCT Application No. PCT/US2013/059811, Dec. 2, 2013, 11 pages.
Philips, I2S Bus Specification, Jun. 5, 1996.
RF Power Amplifier, Mar. 22, 2008, 1 page, May be Retrieved at <http://en.wikipedia.org/wiki/RF_power_amplifier>.
Silicon Labs USB-to-I2S Audio Bridge Chip Brings Plug-and-Play Simplicity to Audio Design, Cision Wire, Feb. 4, 2013.
TN21065L_I25, Interfacing I2S-Compatible Audio Devices to the ADSP-21065L Serial Ports, Apr. 1999.
USB Made Simple, MQP Electronics Ltd, 2006-2008 (78 pages).
"Understanding the FCC Regulations for Low-Power Non-Licensed Transmitters", Office of Engineering and Technology, Federal Communications Commission, OET Bulletin No. 63, Oct. 1993.
Universal Serial Bus, Wikipedia, 2012 (32 pages).
Vahle Electrification Systems, "CPS Contactless Power System", Catalog No. 9d/E, 2004, 12 pages.
Wireless HD: "WirelessHD Specification Version 1.1 Overview," May 1, 2010, pp. 1-95, May be retrieved from the Internet<URL:http://www.wirelesshd.org/pdfs/WirelessHD-Specification-Overview-v1.1May2010.pdf>.
United States Office Action, U.S. Appl. No. 13/485,306, Sep. 26, 2013, 11 pages.
United States Office Action, U.S. Appl. No. 13/541,543, Feb. 12, 2015, 25 pages.
United States Office Action, U.S. Appl. No. 13/541,543, Oct. 28, 2014, 42 pages.
United States Office Action, U.S. Appl. No. 13/427,576, Oct. 30, 2014, 6 pages.
United States Office Action, U.S. Appl. No. 13/524,956, Feb. 9, 2015, 17 pages.
United States Office Action, U.S. Appl. No. 13/524,963, Mar. 17, 2014, 14 pages.
United States Office Action, U.S. Appl. No. 13/657,482, Jan. 2, 2015, 29 pages.
United States Office Action, U.S. Appl. No. 12/655,041, Jun. 7, 2013, 9 pages.
United States Office Action, U.S. Appl. No. 14/047,924, Dec. 19, 2014, 8 pages.
United States Office Action, U.S. Appl. No. 14/047,924, Feb. 27, 2014, 9 pages.
United States Office Action, U.S. Appl. No. 13/784,396, Sep. 11, 2014, 7 pages.
United States Office Action, U.S. Appl. No. 13/760,089, Jul. 7, 2014, 14 pages.
United States Office Action, U.S. Appl. No. 14/596,172, Feb. 10, 2015, 7 pages.
United States Office Action, U.S. Appl. No. 14/462,560, Feb. 13, 2015, 12 pages.
United States Office Action, U.S. Appl. No. 14/026,913, Feb. 25, 2015, 15 pages.
Chinese Second Office Action, Chinese Application No. 201280025060.8, Jun. 11, 2015, 8 pages.
Japanese Office Action, Japanese Application No. 2014-519270, Mar. 9, 2015, 17 pages.
Japanese Office Action, Japanese Application No. 2014-547442, May 25, 2015, 7 pages.
Korean Office Action, Korean Application No. 10-2013-7027865, Apr. 13, 2015, 8 pages.
Li, X. et al., "Space-Time Transmissions for Wireless Secret-Key Agreement with Information-Theoretic Secrecy," IEEE, 2003, pp. 1-5.
United States Office Action, U.S. Appl. No. 14/135,458, Apr. 13, 2015, 13 pages.
United States Office Action, U.S. Appl. No. 13/541,543, May 28, 2015, 17 pages.
United States Office Action, U.S. Appl. No. 14/047,924, May 21, 2015, 6 pages.
United States Office Action, U.S. Appl. No. 14/026,913, Jun. 5, 2015, 16 pages.
United States Office Action, U.S. Appl. No. 13/922,062, Jul. 23, 2015, 10 pages.
Eric A. Juntunen, "60 GHz CMOS Pico-Joule/Bit Oook Receiver Design for Multi-Gigabit Per Second Wireless Communications" thesis paper, Aug. 2008, 52 pages.
Chinese First Office Action, Chinese Application No. 201280038180.1, Dec. 1, 2015, 16 pages.
Chinese Third Office Action, Chinese Application No. 201280025060.8, Dec. 28, 2015, 6 pages.
Chinese First Office Action, Chinese Application No. 201280062118.6, Jan. 5, 2016, 15 pages.
Chinese First Office Action, Chinese Application No. 201380055859.6, Jan. 20, 2016, 5 pages.
Chinese First Office Action, Chinese Application No. 201380048407.5, Feb. 3, 2016, 14 pages.
Enumeration: How the Host Learns about Devices, Jan Axelson's Lakeview Research, 2009, Downloaded on Dec. 31, 2012, 7 pages.
PCM510x 2VRMS DirectPath™, 112/106/IOOdB Audio Stereo DAC with 32-bit, 384kHz PCM Interface, Texas Instruments, May 2011, Revised Sep. 2012, Copyright © 2013, 33 pages.
USB in a NutShell, Craig.Peacock@beyondlogic.org, Copyright 2010, Edited Jun. 24, 2011, Downloaded on Dec. 24, 2012, 43 pages.
Ingerski, J. et al., "Mobile Tactile Communications, The Role of the UHF Follow-On Satellite Constellation and Its Successor, Mobile User Objective System," IEEE, 2002, pp. 302-306.
Japanese Office Action, Japanese Application No. 2014/547442, Mar. 14, 2016, 8 pages.
United States Office Action, U.S. Appl. No. 14/936,877, Mar. 23, 2016, 15 pages.
United States Office Action, U.S. Appl. No. 14/881,901, Dec. 17, 2015, 16 pages.
United States Office Action, U.S. Appl. No. 13/541,543, Dec. 21, 2015, 20 pages.
Chinese First Office Action, Chinese Application 201280043190.4, Jan. 21, 2015, 18 pages.
Chinese Second Office Action, Chinese Application 201280043190.4, Oct. 26, 2015, 5 pages.
European Examination Report, European Application No. 13711499.7, Oct. 5, 2015, 8 pages.
Japanese Office Action, Japanese Application No. 2014-513697, Nov. 2, 2015, 5 pages.
United States Office Action, U.S. Appl. No. 14/026,913, Sep. 18, 2015, 9 pages.
United States Office Action, U.S. Appl. No. 13/657,482, Sep. 22, 2015, 24 pages.
United States Office Action, U.S. Appl. No. 14/047,924, Nov. 18, 2015, 7 pages.
European Examination Report, European Application No. 13821032.3, Apr. 4, 2016, 3 pages.
Taiwan Office Action, Taiwan Application No. 101110057, Mar. 23, 2016, 7 pages.
Taiwan Office Action, Taiwan Application No. 101147406, Mar. 23, 2016, 6 pages.
Chinese First Office Action, Chinese Application No. 201380023102.9, Jun. 14, 2016, 13 pages (with concise explanation of relevance).

(56) References Cited

OTHER PUBLICATIONS

Chinese Fourth Office Action, Chinese Application No. 201280025060.8, Jun. 17, 2016, 5 pages (with concise explanation of relevance).
Japanese Office Action, Japanese Application No. 2015-004839, May 16, 2016, 10 pages.
Taiwan Office Action, Taiwan Application No. 101119491, May 9, 2016, 9 pages.
United States Office Action, U.S. Appl. No. 14/106,765, Jun. 9, 2016, 10 pages.
United States Office Action, U.S. Appl. No. 13/963,199, Jun. 1, 2016, 8 pages.
United States Office Action, U.S. Appl. No. 15/144,756, Jun. 16, 2016, 12 pages.
European Communication Under Rule 164(2)(a) EPC, European Application No. 14726242.2, Jul. 11, 2016, 3 pages.
Taiwan Office Action, Taiwan Application No. 101138870, Jun. 13, 2016, 8 pages.
United States Office Action, U.S. Appl. No. 14/047,924, Aug. 11, 2016, 11 pages.
United States Office Action, U.S. Appl. No. 15/204,988, Aug. 31, 2016, 10 pages.
Chinese Second Office Action, Chinese Application No. 201280038180.1, Aug. 18, 2016, 9 pages (with concise explanation of relevance).
Chinese Second Office Action, Chinese Application No. 201280062118.6, Sep. 6, 2016, 4 pages (with concise explanation of relevance).
Chinese First Office Action, Chinese Application No. 201380071296.X, Sep. 2, 2016, 24 pages (with concise explanation of relevance).
Korean Office Action, Korean Application No. 10-2015-7029405, Jul. 19, 2016, 4 pages (with concise explanation of relevance).
Taiwan Office Action, Taiwan Application No. 101121492, Jul. 28, 2016, 13 pages.
European Extended Search Report, European Application No. 13879021.7, Oct. 17, 2016, 6 pages.

* cited by examiner

EXTREMELY HIGH FREQUENCY COMMUNICATION CHIP

CROSS-REFERENCES TO RELATED APPLICATION

The present application claims the benefit under 35 U.S.C. §119(e) of U.S. Provisional Patent Application Ser. No. 61/799,593 for WAFER-LEVEL EHF COMMUNICATION CHIP, filed Mar. 15, 2013, and of U.S. Provisional Patent Application Ser. No. 61/799,527 for EHF COMMUNICATION LINK WITH EMBEDDED PROCESSOR, also filed Mar. 15, 2013, which applications are hereby incorporated by reference in their entirety for all purposes.

TECHNICAL FIELD

The disclosure relates to the field of electronic systems and devices and, in particular, relates to the field of extremely high frequency (EHF) chip-based communication systems and devices.

BACKGROUND

Advances in semiconductor manufacturing and circuit design technologies have enabled the development and production of integrated circuits (ICs) with increasingly higher operational frequencies. In turn, electronic products and systems incorporating such integrated circuits are able to provide much greater functionality than previous generations of products. This additional functionality has generally included the processing of increasingly larger amounts of data at increasingly higher speeds.

Many electronic systems include multiple printed circuit boards (PCBs) upon which these high-speed ICs are mounted, and through which various signals are routed to and from the ICs. In electronic systems with at least two PCBs and the need to communicate information between those PCBs, in addition to communication between separate electronic devices, such as smart phones and other mobile devices, a variety of connector and backplane architectures have been developed to facilitate information flow between the boards. Unfortunately, such connector and backplane architectures introduce a variety of impedance discontinuities into the signal path, resulting in a degradation of signal quality or integrity. Connecting to boards by conventional means, such as signal carrying mechanical connectors, generally creates discontinuities, requiring expensive electronics to negotiate. Conventional mechanical connectors may also wear out over time, require precise alignment and manufacturing methods, and are susceptible to mechanical jostling.

BRIEF SUMMARY

In a first example, an electromagnetic Extremely High Frequency (EHF) communication chip is provided. The EHF communication chip may include one or more local oscillator circuits, a transducer circuit, and at least one of a modulator or a demodulator coupled to the transducer circuit. A transducer circuit may be any suitable circuit configured to convert between electrical and electromagnetic signals. Each of the one or more local oscillator circuits may have a local oscillator. The one or more local oscillator circuits may be configured collectively to generate at least first and second carrier signals having respective first and second EHF frequencies. The first EHF frequency may be different than the second EHF frequency. The transducer circuit may have at least a first transducer, for transmitting, receiving, or both transmitting and receiving, EHF communication signals having the first EHF frequency or the second EHF frequency. The at least one of a modulator or a demodulator may be coupled to the transducer circuit. The modulator may be coupled to the one or more local oscillator circuits for modulating the first carrier signal or the second carrier signal with a first transmit base data signal. The demodulator may be for demodulating the first carrier signal or the second carrier signal to produce a first receive base data signal.

In a second example, an electromagnetic EHF communication chip may include at least one local oscillator circuit for generating at least one carrier signal, a transducer circuit having at least a first transducer, at least first and second modulators coupled to the at least one local oscillator circuit and the transducer circuit, at least first and second demodulators coupled to the transducer circuit, a first data channel for carrying a first base data signal, a second data channel for carrying a second base data signals and a cross-point switch connected to the first and second modulators, the first and second demodulators, the receive data channel, and the transmit data channel. The cross-point switch may be configured to connect one or both of the first and second data channels to a selected one or more of the modulators and demodulators.

In a third example, an electromagnetic EHF communication chip may include at least one local oscillator circuit for generating at least one carrier signal, a transducer circuit having at least a first transducer, at least a first modulator coupled to the at least one local oscillator circuit and the transducer circuit, at least a first demodulator coupled to the transducer circuit, a first data channel for carrying a first base data signal and a controller circuit configured to generate signals to control one or more components of the electromagnetic EHF communication chip. For example, a controller circuit may detect the frequency of a local oscillator and tune that frequency as required. Alternatively or additionally, the local oscillator frequency may be determined in part by a transducer circuit. Such a circuit may then have a tuning stub mounted externally of the chip so that it is available for use in tuning the local oscillator frequency.

BRIEF DESCRIPTION OF THE DRAWINGS

Figure 1:
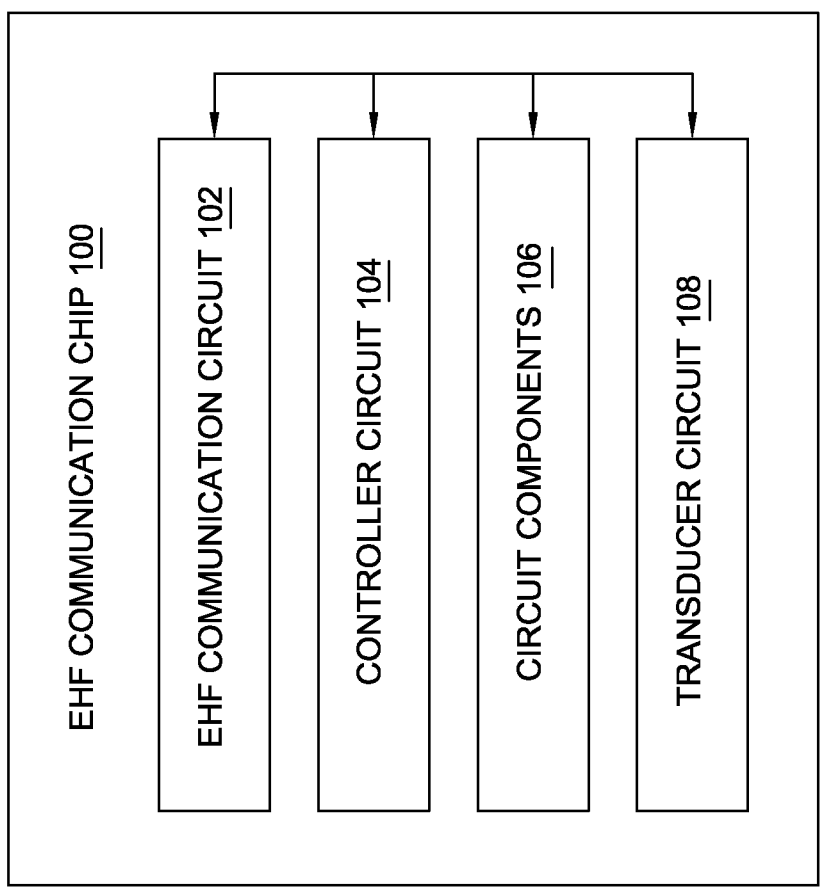
Figure 2:
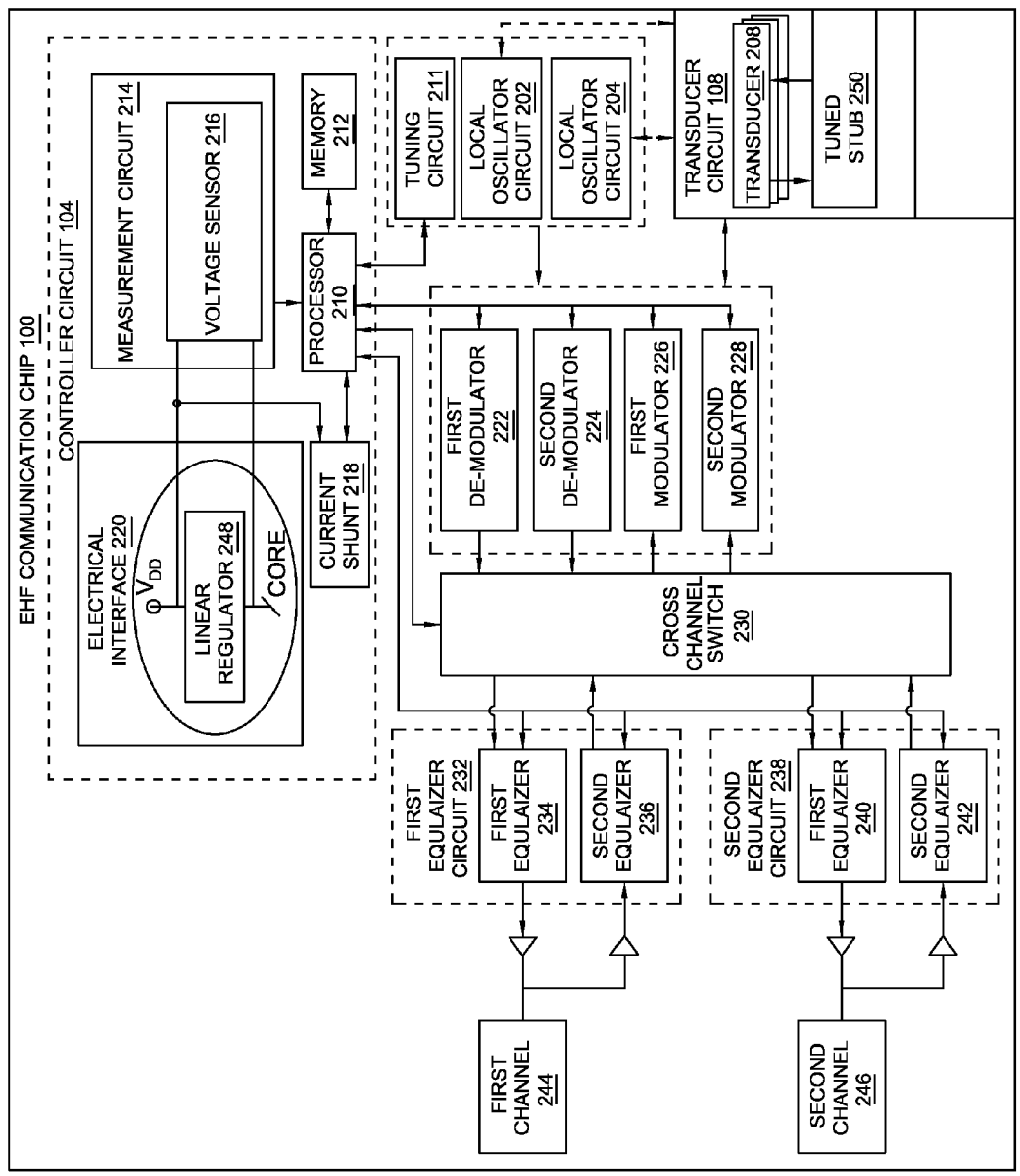

Having thus described the invention in general terms, reference will now be made to the accompanying drawings, which are not necessarily drawn to scale, and wherein:

FIG. 1 is a block diagram illustrating system elements of an exemplary electromagnetic extremely high frequency (EHF) communication chip; and FIG. 2 is a detailed block diagram of an example of an electromagnetic EHF communication chip There may be additional structures described in the description that are not depicted in the drawings, and the absence of such a drawing should not be considered as an omission of such design from the specification.

DETAILED DESCRIPTION

Before describing specific embodiments of EHF communication chips in detail, it should be observed that the described embodiments may utilize apparatus components and method steps related to electronic devices capable of EHF communication. Accordingly, the apparatus components have been represented where appropriate by conventional symbols in the drawings, showing specific details that are pertinent for an understanding of the present disclosure so as not to obscure the disclosure with details that will be readily apparent to those with ordinary skill in the art having the benefit of the description herein.

It is to be further understood that the disclosed embodiments are merely exemplary of the claimed elements, which can be embodied in various forms. Therefore, specific structural and functional details disclosed herein are not to be interpreted as limiting, but merely as a basis for the claims and as a representative basis for teaching one skilled in the art to variously employ the disclosed concepts in an appropriate structure. Further, the terms and phrases used herein are not intended to be limiting but rather to provide an understandable description of the subject matter.

Furthermore, in today's society and computing environment, electronic devices are being used increasingly. Methods and apparatus using EHF communication may provide secure, stable, and high-bandwidth communication between and within these devices.

An example of an EHF communications unit is an EHF communication chip. Throughout this disclosure, the terms communication chip, communication chip package, and EHF communication chip package may be used to refer to IC packages. Examples of such communication chips are described in detail in U.S. Patent Application Publication Nos. 2012/0307932, 2012/0263244, 2012/0286049, and 2013/0070817, all of which are hereby incorporated in their entireties for all purposes. Communication chips are an example of a communication device, also referred to as communication unit, whether or not they provide wireless communication and whether or not they operate in the EHF frequency band.

Wireless communication may be used to provide signal communications between components or modules in a device or may provide communication between devices. Wireless communication provides an interface that is not subject to mechanical and electrical degradation. Examples of systems employing wireless communication between chips are disclosed in U.S. Pat. No. 5,621,913 and U.S. Published Patent Application No. 2010/0159829, the disclosures of which are incorporated herein by reference in their entirety for all purposes.

In one example, tightly-coupled transmitter/receiver pairs may be deployed with a transmitter disposed at a terminal portion of a first conduction path and a receiver disposed at a terminal portion of a second conduction path. The transmitter and receiver may be disposed in close proximity to each other depending on the strength of the transmitted energy, and the first conduction path and the second conduction path may be discontinuous with respect to each other. In exemplary versions, the transmitter and receiver may be disposed on separate circuit carriers positioned with the transducers of the transmitter/receiver pair in close proximity. In some examples, the transducers may be antennas.

A transmitter or receiver may be configured as an IC package, in which a transducer may be positioned adjacent to a die and held in place by a dielectric or insulating encapsulation or bond material. A transmitter or receiver may be configured as an IC package, in which a transducer may be positioned adjacent to a die and held in place by encapsulation material of the package and/or a lead frame substrate.

These IC packages, along with contactless power transfer methods, may be used to create modular components for electronic devices. Because modules can thus transfer data and power without contacts, each module may be self-contained, and may be environment-proofed. Modules may be assembled and disassembled with ease, even by hand, as no complicated and/or easily-damaged connectors are used in assembly. The modules may be configured with magnets or clips to connect to each other in one or more configurations. In this fashion, modules may be field-swapped to repair or upgrade, and complicated final assembly steps may be eliminated. Customization by the user may be facilitated. By using the short-range EHF IC packages to provide communication, relaxed module alignment requirements may be facilitated due to the relatively tolerant EHF coupling characteristics of the IC packages. Exposed metal may be eliminated as well, resulting in better wear characteristics and enabling capabilities such as waterproofing.

FIG. 1 illustrates a block diagram of an electromagnetic extremely high frequency (hereinafter EHF) communication chip 100, in accordance with an embodiment of the present disclosure. The EHF communication chip 100 may include an EHF communication circuit 102, a controller circuit 104, one or more circuit components 106, and a transducer circuit 108. The EHF communication circuit 102 may be configured to modulate and transmit digital signals and/or receive and demodulate transmitted signals at or near a desired EHF frequency, or within a preselected range of EHF frequencies. In addition, the EHF communication circuit 102 may be used to set a desired EHF frequency for the modulated digital signals. Further, the EHF communication circuit 102 may be used to modulate a digital signal to a modulated EHF signal having a predetermined frequency.

The controller circuit 104 may enable procedural program control for the operations of the EHF communication chip 100. Moreover, the controller circuit 104 may monitor, control and direct the EHF link management and operation of one or more circuit components 106. For example, the controller circuit 104 may control transmitted carrier frequencies and power, receiver tuning and sensitivity, signal path management, enumeration states, power management, and the like. In addition, the controller circuit 104 may provide authentication and security services. Further, the controller circuit 104 may enable the EHF communication chip 100 to be reconfigured from an external chip, and provide status or other information to the external chip. It may be noted the controller circuit 104 may manage various operating parameters of one or more circuit components 106. An example of a system for managing component parameters is disclosed in U.S. Published Patent Application No. 2013/0316653 titled 'System for Constraining an Operating Parameter of an EHF Communication Chip", which is incorporated herein in its entirety.

The transducer circuit 108 of the EHF communication chip 100 may include one or more transducers for transmitting and/or receiving signals. As mentioned, in some embodiments, the transducers may be antennas. The transducer may act as transducer to convert between electrical and electromagnetic signals. It may be noted that the transducer may function both as a transmitter and a receiver, or may transmit only, or receive only.

Now, referring to FIG. 2, a detailed block diagram of an EHF communication chip 100 is provided. The EHF communication chip 100 may include the controller circuit 104, the transducer circuit 108, one or more local oscillator circuits 202 and 204. The one or more local oscillator circuits 202 and 204 may be coupled to one or more modulators 226 and 228. A cross-point switch 230 may enable communication between modulators (226 and 228), demodulators (222 and 224) with one or more data channels (say a first data channel 244 and a second data channel 246) via a corresponding first equalizer circuit 232 and a second equalizer circuit 238. The one or more channels may carry a respective base data signal. For example, first channel 244 may carry a first data signal and second channel 246 may carry a second data signal. The transducer circuit 108 may include one or more transducers, such as a transducer 208, to transmit, receive, or both transmit and receive EHF communication signals. Transducer 208 may be resident on the EHF communication chip or may be external to the EHF communication chip. Further, the transducer circuit 108 may be coupled to one or more local oscillator circuits 202 and 204.

The local oscillator circuits 202 and 204 may be configured to generate multiple carrier signals. For example, the local oscillator circuit 202 may generate a first carrier signal and the local oscillator circuit 204 may generate a second carrier signal. The first and the second carrier signals may have different EHF frequencies, which may or may not be harmonically related. It may be noted that local oscillator circuit 202 or the local oscillator circuit 204 may generate multiple hormonally related carrier signals.

As mentioned above, the processor 210 of the controller circuit 104 may generate control signals to control one or more components of the EHF communication chip 100. In the present example, the processor 210 may be coupled to a tuning circuit 211 of one or more local oscillator circuits 202 and 204 and may generate control signals to vary the frequencies of the first and the second carrier signals produced by the associated local oscillator circuit.

The first and second carrier signals having different EHF frequencies may be provided to corresponding one or more modulators (the first modulator 226 and the second modulator 228). The first modulator 226 may be coupled to the local oscillator circuit 202. Similarly, the second modulator 228 may be coupled to the local oscillator circuit 204.

In an embodiment, the first modulator 226 and the second modulator 228 may modulate the first and the second carrier signals with a transmitted base data signal. Similarly, the first demodulator 222 and the second demodulator 224 may de-modulate the first and the second carrier signals to produce receive base data signals.

The cross-point switch 230 may switch one or both of the first data channel 244 and the second data channel 246 to a selected one or more of the first modulator 226, the second modulator 228, the first demodulator 222 and the second demodulator 224. However, each of the first data channel 244 and the second data channel 246 may include both a transmit data line and a receive data line. Further, the cross-point switch 230 may selectively connect one of the first modulator 226 and the second modulator 228 to a selected one or both of the transmit data lines. In addition, the cross-point switch 230 may selectively connect one of the first demodulator 222 and the second demodulator 224 to a selected one or both of the receive data lines.

Additionally, the controller circuit 104 may detect communication information from one of the received base data signal and the transmitted base data signal and, through operation of the processor 210, may control the switching of the cross-point switch 230 in response to the detected communication information. Generally, then, the processor 210 may control the operation of the one or more components in response to a sensed change in an operating parameter. For example, the processor 210 of the controller circuit 104 may control switching of the cross-point switch 230 based on the detected communication information. The detected information may include, for example, information related to alignment of the respective transducer 208 receiving an EHF communication signal from an external transmitter transducer of an external device.

For example, the processor 210 of the controller circuit 104 may sense a signal received by the transducer 208 or by an input channel signal (the first data channel 244 or the second data channel 246) and may determine information in that signal or characteristics of the signal indicating the processing of signals. Operation may depend on the alignment of the corresponding transducers on an external device. If an external transmitting transducer is aligned with a transducer (say an transducer A) of the EHF communication chip 100 and an external receiving transducer is aligned with the transducer (say an transducer B) of the EHF communication chip 100. The chip circuits may be configured based on the received signals as detected by the controller circuit 104. If the transducers of the external device get reversed, then the crosspoint switch may be controlled to change the routing of signals between the data channels and the modulators and demodulators to maintain communication with the external device.

In a further example, the first equalizer circuit 232 having a first equalizer 234 and a second equalizer 236 and the second equalizer circuit 238 including a first equalizer 240 and a second equalizer 242 may be controllable to adjust the level of the data signals. Each of the first equalizer circuit 232 having the first equalizer 234 and a second equalizer 236 and the second equalizer circuit 238 having the first equalizer 240 and the second equalizer 242 may be connected to and controlled by the processor 210.

The controller circuit 104 may also include an electrical interface 220, a measurement circuit 214, a current shunt circuit 218, and a memory 212, in addition to the processor 210. The controller circuit 104 may communicate information to facilitate communication with an external device. The electrical interface 220 may transmit and receive base data signals to and from the external device over a separate communication link, or it may be coupled to one of data channels 240 or 244 for encoding controller signals over the EHF communication link.

Alternatively, communication may be over a power supply lead received from externally of the EHF communication chip. In this example, the supply voltage may vary between 1.2 volts and 3.6 volts. A linear regulator 248 may be used to stabilize a variable supply voltage to provide a stable core voltage of 1.0 volts, for example, that is applied to circuits in the EHF communication chip. The electrical interface, then, provides access to both the supply voltage and the regulated voltage as operating parameters. The measurement circuit 214 may include a voltage sensor 216 coupled to the processor 210 to detect the variation in supply voltage. Specifically, the voltage sensor 216 may sense a changing voltage difference between the supply voltage and the regulated voltage. The changing voltage level may be a signal received from a circuit or device external to the EHF communication chip. Further, the measurement circuit 214 may communicate a voltage-difference signal representative of the sensed voltage difference to the processor 210.

Furthermore, the current shunt circuit 218 may change the current being conducted on a voltage supply conductor providing the supply voltage ($V_{DD}$) in response to communication signals received from the processor 210. In an example, power is supplied to the EHF communication chip 100 by a ground lead and a supply voltage lead.

A signal from an external device may be fed to the controller circuit 104 by applying the signal to the supply voltage lead through the electrical interface 220. The variation in voltage level may be detected by the voltage sensor 216 and transmitted to the processor 210, which then detects the information in the supply voltage signal. The detected information may allow the processor 210 of the controller circuit 104 to control various operational parameters of the components of the EHF communication chip 100. In an embodiment, the sensed voltage difference may be a control signal received from the external device and may be representative of a selected operating frequency of the local oscillator of one or more local oscillators 202 and 204. The processor 210 may control the frequency of the local oscillator of one or more local oscillators 202 and 204 in response to the received control signal.

As mentioned above, the EHF communication chip 100 may provide status or other information to an external device. An outgoing signal may be applied to the supply voltage lead. In this case, the current shunt 218 may vary the current on the supply voltage lead in response to signals received from the processor 210. The signals generated by changing the current on the supply voltage lead may enable the processor 210 to be reconfigured from an external device or circuit and for the EHF communication chip 100 to provide status or other information to the external device or circuit.

Memory 212 may be coupled to the processor 210 in the controller circuit 104 to store programs and factory settings for operating the EHF communication chip 100. The memory 212 may provide procedural instructions to the processor 210, or the processor may be embodied in firmware. Examples of the memory 212 include but may not be limited to EEPROM, RAM, or NVRAM.

In another embodiment, the transducer circuit 108 may be part of a resonant circuit in a local oscillator, which establishes the frequencies of the first and the second carrier signals produced by the local oscillator circuit 202 and the local oscillator circuit 204. In this embodiment, a tuned stub 250 on the line to the transducer circuit 108 may be part of the local oscillator circuit 202 and the local oscillator circuit 204. The tuned stub 250 may be provided external of the EHF communication chip 100, such as by metalizing the exterior of the EHF communication chip 100. The tuned stub may affect the frequency and Q of the associated local oscillator circuit, allowing the local oscillator frequency to be fine-tuned without disturbing the chip.

An EHF communications unit may thus incorporate an EHF communication chip having a chip circuit with one or more of the various features described with reference to EHF communication chip 100. Use of such a chip may reduce the chip count, board area requirements, total cost of the system, and the like, while enabling high bandwidth data transfer. Further, such a chip may eliminate a step of encapsulating a communication unit to form a package during the manufacturing of the EHF communication unit, thereby reducing the overall cost. Moreover, efficient utilization of the available bandwidth on the EHF communication link may be achieved.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. An electromagnetic Extremely High Frequency (EHF) communication chip comprising:
    one or more local oscillator circuits each having a local oscillator, the one or more local oscillator circuits being configured collectively to generate at least first and second carrier signals having respective first and second EHF frequencies, the first EHF frequency being different than the second EHF frequency,
    a transducer circuit having at least a first transducer, for transmitting, receiving, or both transmitting and receiving EHF communication signals having the first EHF frequency or the second EHF frequency;
    at least one of a modulator or a demodulator coupled to the transducer circuit, the modulator being coupled to the one or more local oscillator circuits for modulating with a first transmit base data signal the first carrier signal or the second carrier signal, and the demodulator for demodulating the first carrier signal or the second carrier signal to produce a first receive base data signal; and
    a controller circuit configured to generate signals to control one or more components of the electromagnetic EHF communication chip and communicate associated information with an external device, the controller circuit comprising:
        a processor;
        an electrical interface operatively coupling the processor to one or both of the transmit and receive base data signals for transmitting signals to and receiving signals from the external device over an EHF communication link coupled to the at least a first transducer; and
        a measurement circuit operatively coupled to the processor and configured to sense a change in at least one operating parameter of the one or more components, the measurement circuit comprising a voltage sensor coupled to the processor to sense a voltage difference between a supply voltage and a regulated voltage applied to components on the electromagnetic EHF communication chip and to communicate to the processor a voltage-difference signal representative of a sensed voltage difference, wherein the sensed voltage difference is a control signal received from the external device and is representative of a selected operating frequency of the local oscillator, and the processor controls the frequency of the local oscillator in response to the received control signal.

2. The electromagnetic EHF communication chip of claim 1, wherein the one or more local oscillators are responsive to one or more control signals for varying the frequency of at least one of the first and second carrier signals; the electromagnetic EHF communication chip further comprising a controller circuit coupled to the one or more local oscillator circuits, and responsive to the first and second frequencies of the first and second carrier signals for generating the one or more control signals appropriate for varying the frequency of one or both of the first and second carrier signals.

3. The electromagnetic EHF communication chip of claim 1, wherein the at least one modulator or a demodulator includes at least first and second modulators and at least first and second demodulators, the electromagnetic EHF communication chip further comprising a first data channel, and a second data channel for carrying the base data signals, and a cross-point switch connected to the first and second modulators, the first and second demodulators, a receive data channel, and a transmit data channel, the cross-point switch being configured to switch selectively each of the modulators and demodulators to at least one of the first and second data channels.

4. The electromagnetic EHF communication chip of claim 1, wherein the processor controls the operation of the one or more components in response to the sensed change in the at least one operating parameter.

5. The electromagnetic EHF communication chip of claim 1, wherein the controller circuit further comprises a memory coupled to the processor for storing information associated with the operation of the one or more components.

6. The electromagnetic EHF communication chip of claim 1, wherein the controller circuit further comprises a current shunt coupled to the processor and configured to change current on a voltage supply conductor in response to a communication signal received from the processor.

7. An electromagnetic Extremely High Frequency (EHF) communication chip comprising:
  at least one local oscillator circuit for generating at least one carrier signal;
  a transducer circuit having at least a first transducer;
  at least first and second modulators coupled to the at least one local oscillator circuit and the transducer circuit;
  at least first and second demodulators coupled to the at least one local oscillator circuit and the transducer circuit;
  a first data channel for carrying a first base data signal;
  a second data channel for carrying a second base data signal;
  a cross-point switch connected to the first and second modulators, the first and second demodulators, a receive data channel, and a transmit data channel, the cross-point switch being configured to connect one or both of the first and second data channels to a selected one or more of the modulators and demodulators; and
  a controller circuit coupled to the cross-point switch, wherein the controller circuit is configured to:
    control the switching of the one or more modulators and the one or more demodulators to the first and second data channels,
    detect communication information from at least one of a receive base data signal from the demodulator and a transmit base data signal from the modulator,
    control the switching of the cross-point switch in response to the detected communication information, and
    control the switching of the cross-point switch based on the detected communication information indicating which demodulator is receiving an EHF communication signal corresponding to a respective alignment of one of the transducers of the EHF communication chip and an external transmitter transducer of an external device.

8. The electromagnetic EHF communication chip of claim 7, wherein each data channel includes a transmit data line and a receive data line, the cross-point switch being further configured to selectively connect one of the modulators to a selected one or both of the transmit data lines; to selectively connect one or both demodulators to a selected one or both of the receive data line.

9. The electromagnetic EHF communication chip of claim 7, wherein the controller circuit is further configured to generate signals to control one or more components of the electromagnetic EHF communication chip in addition to the cross-point switch, and communicate associated information with an external device.

10. The electromagnetic EHF communication chip of claim 9, wherein the controller circuit comprises:
  a processor;
  an electrical interface operatively coupling the processor to one or both of a transmit base data signal and a receive base data signal for transmitting signals to and receiving signals from an external device over an EHF communication link coupled to the at least one transducer; and
  a measurement circuit operatively coupled to the processor and configured to sense a change in at least one operating parameter of the one or more components.

11. The electromagnetic EHF communication chip of claim 10, wherein the controller circuit further comprises a memory coupled to the processor for storing information associated with the operation of the one or more controlled components.

12. The electromagnetic EHF communication chip of claim 10, wherein the measurement circuit comprises a voltage sensor coupled to the processor to sense a voltage difference between a supply voltage and a regulated voltage applied to components on the electromagnetic EHF communication chip and to communicate to the processor a voltage-difference signal representative of the sensed voltage difference.

13. The electromagnetic EHF communication chip of claim 10, wherein the controller circuit further comprises a current shunt adapted to change current on a voltage supply conductor in response to signals received from the processor.

14. An electromagnetic Extremely High Frequency (EHF) communication chip comprising:
  at least one local oscillator circuit for generating at least one carrier signal;
  a transducer circuit having at least a first transducer;
  at least a first modulator coupled to the at least one local oscillator circuit and the transducer circuit;
  at least a first demodulator coupled to the at least one local oscillator circuit and the transducer circuit;
  a first data channel for carrying a first base data signal; and
  a controller circuit configured to generate signals to control one or more components of the electromagnetic EHF communication chip, the controller comprising:
    a processor,
    an electrical interface operatively coupling the processor to one or both of a transmit base data signal and a receive base data signal for transmitting signals to and receiving signals from an external device over an EHF communication link coupled to the at least a first transducer,
    a measurement circuit operatively coupled to the processor and configured to sense a change in at least one operating parameter of the one or more components, and a current shunt coupled to the processor and configured to change current on a voltage supply conductor in response to a communication signal received from the processor.

15. The electromagnetic EHF communication chip of claim 14, wherein the control circuit is further configured to communicate with external device information associated with the one or more components.

16. The electromagnetic EHF communication chip of claim 14, wherein the processor controls the operation of the one or more components in response to the sensed change in the at least one operating parameter.

17. The electromagnetic EHF communication chip of claim 14, wherein the controller circuit further comprises a memory coupled to the processor for storing information associated with the operation of the one or more components.

18. The electromagnetic EHF communication chip of claim 14, wherein the measurement circuit comprises a voltage sensor coupled to the processor to sense a voltage difference between a supply voltage and a regulated voltage applied to components on the electromagnetic EHF communication chip and to communicate to the processor a voltage-difference signal representative of the sensed voltage difference.

19. The electromagnetic EHF communication chip of claim 18, wherein the controller circuit further comprises a current shunt coupled to the processor and configured to change current on a voltage supply conductor in response to a communication signal received from the processor.

* * * * *